(12) United States Patent
Liensberger et al.

(10) Patent No.: US 10,089,335 B2
(45) Date of Patent: Oct. 2, 2018

(54) DATA LINEAGE ACROSS MULTIPLE MARKETPLACES

(75) Inventors: Christian Liensberger, Bellevue, WA (US); Rene J. Bouw, Kirkland, WA (US); Ori Kashi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 667 days.

(21) Appl. No.: 13/545,398

(22) Filed: Jul. 10, 2012

(65) Prior Publication Data
US 2014/0019423 A1    Jan. 16, 2014

(51) Int. Cl.
*G06F 17/30* (2006.01)

(52) U.S. Cl.
CPC .. *G06F 17/30309* (2013.01); *G06F 17/30368* (2013.01); *G06F 17/30371* (2013.01)

(58) Field of Classification Search
CPC ......... G06F 17/30038; G06F 17/30283; G06F 17/30303; G06F 17/30309; G06F 17/30598; G06F 17/30371; G06F 17/30554; G06F 17/30312
USPC .......... 707/690, 691, 697, E17.095, E17.102
See application file for complete search history.

(56) References Cited

U.S. PATENT DOCUMENTS

| | | | |
|---|---|---|---|
| 6,343,295 B1 | 1/2002 | MacLeod et al. | |
| 6,434,558 B1* | 8/2002 | MacLeod et al. | |
| 6,609,123 B1 | 8/2003 | Cazemier et al. | |
| 8,356,314 B2* | 1/2013 | Sprunk | H04N 7/1675 380/202 |
| 2002/0019827 A1 | 2/2002 | Shiman et al. | |
| 2006/0294151 A1* | 12/2006 | Wong et al. | 707/200 |
| 2007/0088957 A1* | 4/2007 | Carson | 713/176 |
| 2007/0255741 A1* | 11/2007 | Geiger et al. | 707/101 |

(Continued)

FOREIGN PATENT DOCUMENTS

| | | |
|---|---|---|
| CN | 101673365 A | 3/2010 |
| CN | 101872406 A | 10/2010 |

OTHER PUBLICATIONS

Gehani, Ashish, and Minyoung Kim. "Mendel: Efficiently verifying the lineage of data modified in multiple trust domains." Proceedings of the 19th ACM International Symposium on High Performance Distributed Computing. ACM, 2010.*

(Continued)

*Primary Examiner* — Nan Hutton
(74) *Attorney, Agent, or Firm* — Workman Nydegger (57) ABSTRACT

Tracking lineage of data. A method may be practiced in a network computing environment including a plurality of interconnected systems where data is shared between the systems. A method includes accessing a dataset. The dataset is associated with lineage metadata. The lineage metadata includes data indicating the original source of the data, one or more intermediary entities that have performed operations on the dataset, and the nature of operations performed on the dataset. A first entity performs an operation on the dataset. As a result of performing a first operation on the dataset, the method includes updating the lineage metadata to indicate that the first entity performed the operation on the dataset. The method further includes providing functionality for determining if the lineage metadata has been compromised in that the lineage metadata has been at least one of removed from association with the dataset, is corrupted, or is incomplete.

20 Claims, 4 Drawing Sheets

(56) References Cited

U.S. PATENT DOCUMENTS

| | | |
|---|---|---|
| 2008/0040388 A1 | 2/2008 | Petri et al. |
| 2010/0138431 A1* | 6/2010 | Bator et al. ................. 707/755 |
| 2010/0250689 A1 | 9/2010 | Dill et al. |
| 2011/0035354 A1 | 2/2011 | Wan |
| 2011/0071979 A1 | 3/2011 | Tahiliani et al. |
| 2013/0080197 A1* | 3/2013 | Kung et al. ................. 705/7.11 |

OTHER PUBLICATIONS

Zhang, Olive Qing, et al. "How to track your data: The case for cloud computing provenance." Cloud Computing Technology and Science (CloudCom), 2011 IEEE Third International Conference on. IEEE, 2011.*

Author Unknown, "Bulletin of the Technical Committee on Data Engineering", Published on: Mar. 1999, Available at: http://sites.computer.org/debull/99mar/99MAR-CD.pdf#page=11.

Author Unknown, "The Hippocratic File System: Protecting Privacy in Networked Storage", Published on: Oct. 9, 2006, Available at: http://crypto.stanford.edu/~cao/hippocratic-fs.pdf.

"International Search Report & Written Opinion for PCT Patent Application No. PCT/US2013/049812", dated Sep. 20, 2013, Filed Date: Jul. 9, 2012, 9 Pages.

Office Action issued in Chinese Patent Application No. 201380036865.7 dated Dec. 30, 2016.

"Office Action Issued in European Patent Application No. 13739581.0", dated Dec. 21, 2017, 6 Pages.

"Second Office Action Issued in Chinese Patent Application No. 201380036865.7", dated Aug. 11, 2017, 9 Pages.

* cited by examiner

DATA LINEAGE ACROSS MULTIPLE MARKETPLACES

BACKGROUND

Background and Relevant Art

Computers and computing systems have affected nearly every aspect of modern living. Computers are generally involved in work, recreation, healthcare, transportation, entertainment, household management, etc.

Modem computing systems have the capability to generate, store, and/or process large amounts of data. For example, data may be collected by data collection mechanisms coupled to sensors, web services, or other data sources. Raw data can be operated on to create even more data. Data previously only available in non-digital form (such as paper books, newspaper and magazine archives, film pictures and/or movies, handwritten or type written records, etc.) may be digitized and stored in computer storage systems. Mass storage is very inexpensive, so this data can be persisted for long periods of time, without the need to destroy the data to reclaim the storage space, allowing the data to persist virtually indefinitely with little cost. Thus, large amounts of data can be generated and accumulated.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system. Given the large amounts of data available and the interconnected nature of various computing systems, computing systems can have access to large amounts of data from a multitude of different sources.

Tracking the lineage (e.g. source and history) of data is a hard problem to solve. For example, data may be taken out of a system, manipulated and placed back into the system. What happened to the data while out of the system, or where data is coming from and what happened with the data prior to receiving the data may be hard to understand and track.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a network computing environment including a plurality of interconnected systems where data is shared between the systems. The method includes acts for tracking lineage of data. The method includes accessing a dataset. The dataset is associated with lineage metadata. The lineage metadata includes data indicating the original source of the data, one or more intermediary entities that have performed operations on the dataset, and the nature of operations performed on the dataset. The method further includes determining that the lineage metadata has been compromised in that the lineage metadata has been at least one of removed from association with the dataset, is corrupted, or is incomplete. As a result of determining that the lineage metadata has been compromised, the method further includes invalidating the dataset.

Another embodiment illustrated herein includes a method that may be practiced in a network computing environment including a plurality of interconnected systems where data is shared between the systems. The method includes acts for tracking lineage of data. The method includes accessing a dataset. The dataset is associated with lineage metadata. The lineage metadata includes data indicating the original source of the data, one or more intermediary entities that have performed operations on the dataset, and the nature of operations performed on the dataset. A first entity performs an operation on the dataset. As a result of performing a first operation on the dataset, the method includes updating the lineage metadata to indicate that the first entity performed the operation on the dataset. The method further includes providing functionality for determining if the lineage metadata has been compromised in that the lineage metadata has been at least one of removed from association with the dataset, is corrupted, or is incomplete.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement the ability to associate lineage metadata with a dataset. The lineage metadata may include the ultimate source of the dataset and/or operations that have been performed on the dataset over the life of the dataset or over some period of the life of the dataset. If the lineage metadata becomes compromised, such as by: becoming unassociated with the dataset, becoming corrupted, being incomplete due to later undocumented operations performed on the dataset, by the data itself becoming corrupted so that the lineage metadata no longer accurately describes the state of the dataset, etc., then the dataset can be invalidated or otherwise treated with a lower tier status. For example, the dataset may be completely discarded. Alternatively or additionally the dataset may be marked as invalid, although the dataset may still be readable, but maybe annotated with an indication that the dataset is invalid when displayed to a user.

Figure 1A:
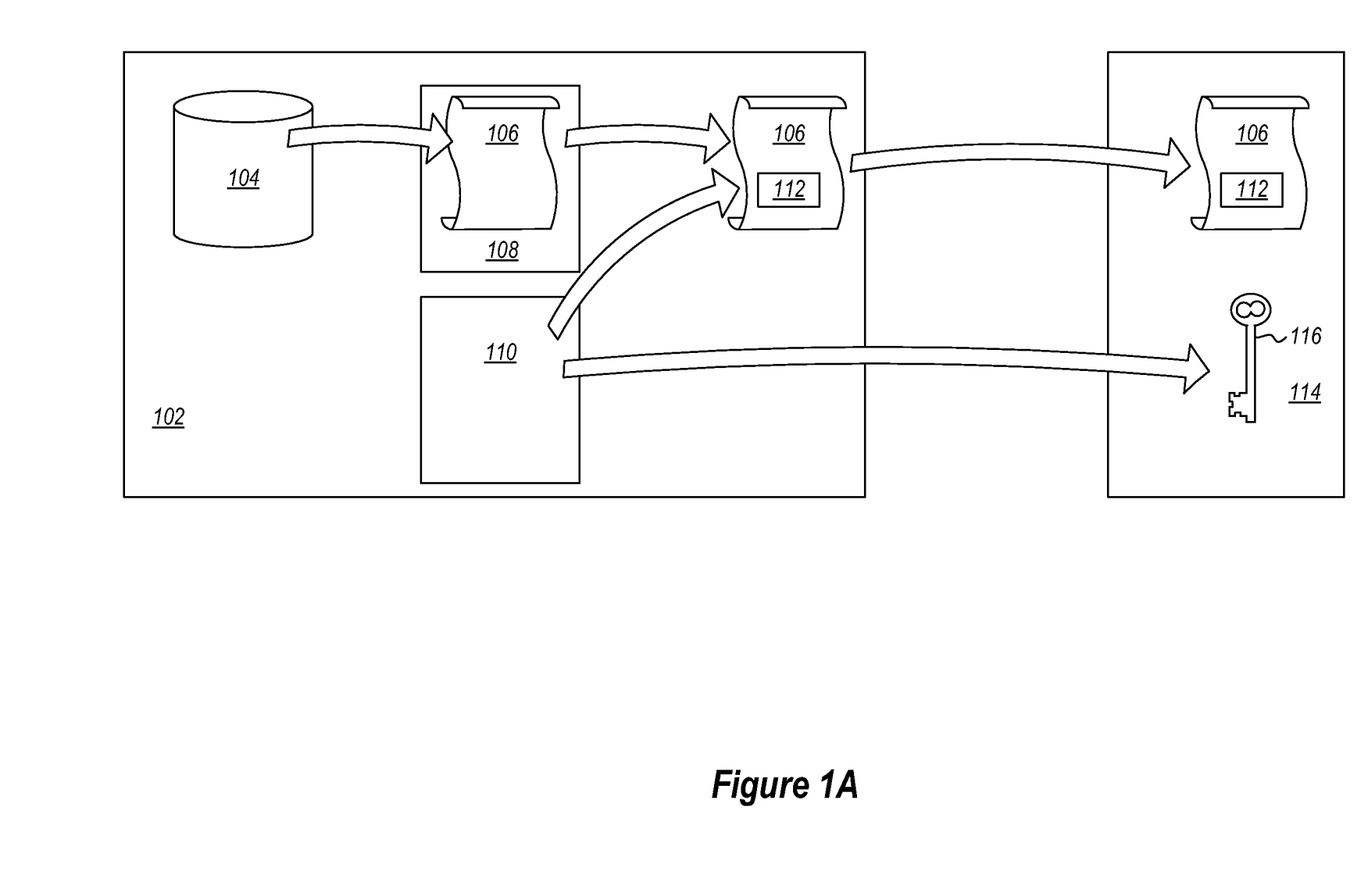
FIG. 1A illustrates a system that creates and embeds lineage metadata in datasets.
Figure 1B:
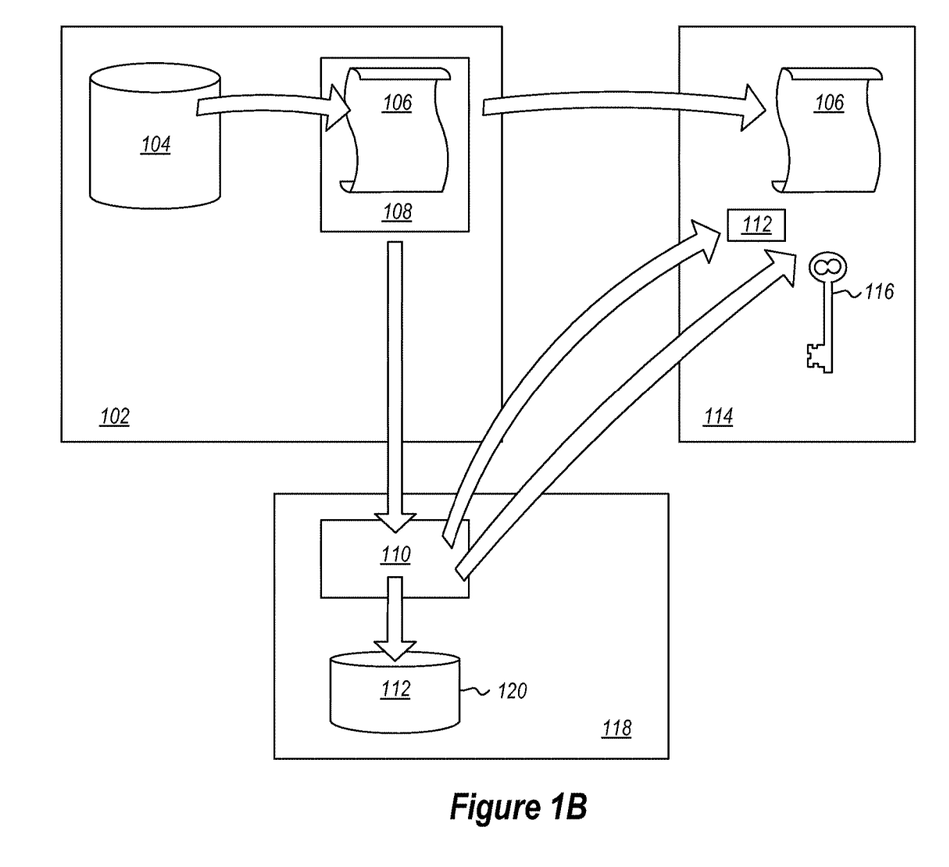
FIG. 1B illustrates a central governance entity that creates and handles lineage metadata.

Functionality for associating the dataset with the lineage metadata may be accomplished in a number of different fashions. For example, as illustrated in FIG. 1A, the dataset 106 may be annotated so as to include the lineage metadata 112 as metadata included with the dataset. Alternatively or additionally, as illustrated in FIG. 1B, an external service 118 may associate lineage metadata 112 with a dataset 106, but may store the lineage metadata separate from the dataset and maintain the association of the lineage metadata with the dataset separate from various entities in an environment. This may be done, for example, when the entities in the environment do not include native capability for handling annotations to the dataset.

Some embodiments may be practiced in an environment including a large number of disparate and unrelated data sources provided by different data providers, but where data is provided from the data sources by a single provider through a data platform that has access to the data providers from which it can provide data. One such data platform is the Windows Azure® Marketplace available from Microsoft Corporation of Redmond Wash.

Referring now to FIG. 1A, an example is illustrated. The example illustrates a first entity 102. The first entity includes a database 104. The database 104 may store various datasets. In the particular example the dataset 106 is illustrated. The dataset 106 is provided by the database 104 to a module 108. The module 108 performs various actions on the dataset 106. The entity 102 includes a lineage metadata module 110. The lineage metadata module 110 includes functionality for generating lineage metadata 112. The lineage metadata 112 generated by the lineage metadata in module 110 may include various pieces of information such as information about the entity 102, information about the operations that are performed by the module 108, etc. Generally, the lineage information may include information about what operations were performed, who performed the operations, and when the operations were performed.

In the example illustrated in FIG. 1A, the lineage metadata 112 is embedded into the dataset 106. The dataset 106 and the embedded lineage metadata can be transmitted to a second entity 114. In some embodiments the combination of the dataset 106 and the lineage metadata 112 may be signed using an encryption key algorithm to ensure that the dataset 106 and/or the lineage metadata 112 have not been tampered with. For example is illustrated in FIG. 1A, a private key 116 may be provided to the second entity 114 to allow the second entity 114 to ensure that the dataset 106 and the lineage metadata 112 are valid. Alternatively or additionally, the first entity 102 may simply perform a checksum on the dataset 106 and the lineage metadata 112, and can provide the checksum to the second entity 114, which allows the second entity 114 to verify the lineage metadata 112. If the lineage metadata 112 fails the various checks, in some embodiments the image data may be invalidated and discarded as described previously.

Referring now to FIG. 1B, an alternative example is illustrated. FIG. 1B illustrates using a central governance entity 118 to create and manage lineage metadata. The central governance entity 118 may be used when entities are not able to natively handle lineage metadata. For example, the entity 102 may not be able to create lineage metadata. Alternatively or additionally, the entity 102 may not be able to process datasets with embedded lineage metadata. These challenges can be overcome by using a central governance entity 118.

FIG. 1 illustrates that a module 108 performs operations on the dataset 106 retrieved from a database 104. The module 108 can also inform a lineage metadata module 110 at a central governance entity 118 details about the operations performed by the module 108. The lineage metadata module 110 can create lineage metadata 112, or augment previously existing lineage metadata 112 for the dataset 106 describing the ultimate source of the dataset 106 and/or operations performed on the dataset 106.

The lineage metadata 112 can be associated with the dataset 106 and stored in a database 120 at the central governance entity (or at some other location). The lineage metadata 112 can be associated with the dataset 106 in a number of different ways. For example, in some embodiments, the lineage metadata 112 may be associated with the dataset 106 by correlating a unique identifier, such as a GUID, for the dataset 106 with the lineage metadata 112 in the database 120. Alternatively or additionally, the lineage metadata 112 may be associated with the dataset 106 by associating identifiers created when implementing integrity mechanisms, as described in more detail below, for the lineage metadata 112.

The central governance entity 118 can implement integrity mechanisms to ensure that the lineage metadata 112 matches the dataset 106 and that the lineage metadata 112 and/or the dataset 106 have not been corrupted or compromised. For example, the lineage metadata module 110 could calculate a checksum of the dataset 106 and associate the checksum with the lineage metadata 112 and the dataset 106. The central governance entity can store the lineage metadata 112 and integrity data in a database 120.

The first entity 102 may provide the dataset 106 to a second entity 114. The second entity 114 may have an interest in the lineage metadata 112. The lineage metadata can be obtained from the central governance entity 118. The second entity 114 can obtain keys 116 or other integrity information from the central governance entity 118. Additional details will now be illustrated.

As noted, some embodiments described herein implement a central governance entity 118 that has the ability to reach into all the various repositories, such as the entities 102 and 114, in a data market and understand which data is stored in which repository, including the lineage metadata of the data. The central governance entity 118 also keeps track of how all the various data assets leave and enter the various repositories. For example, the central governance entity 118 may be able to track when a user downloads data from a repository, when new data is uploaded to a repository, when a new dataset is created in the repository, when a dataset is deleted, when a dataset is renamed, when columns or other entities are renamed, etc. In some embodiments, this may be accomplished by the central governance entity 118 associating a GUID for data or checksums and hashes with datasets to identify and keep track of datasets and to ensure that datasets are appropriately coordinated with lineage metadata.

By keeping track of all these lineage changes the system is able to keep track of how the changes affect the relationship between data that is derived from other data. Further, by keeping track of multiple data repositories at once, the system can understand how all changes affect data and derivatives as they move around in the system.

To ensure that data is also tracked as it leaves the repositories beyond the reach of the central governance entity 118, data and artifacts may be tagged as they leave the system. These tags are added to the metadata of the data and artifacts and when these assets reappear in any of the various repositories supervised by the central governance entity 118 the tracking of these elements can be resumed.

Further, in some embodiments, the central governance entity 118 also has the ability to be plugged into custom solutions. Thus, embodiments may implement one or more integration points (e.g., API etc.) that enables third parties to integrate and extend tracking of the data in the various repositories so as to provide consistent management of the lineage metadata.

Embodiments may include functionality for associating lineage metadata with data other than the temporally proximal ways that occur when the data is operated on as illustrated in the examples above. This may be needed, for example when the data is not already associated with lineage metadata so as to "bootstrap" data into a lineage metadata paradigm. Alternatively or additionally, this may occur when lineage metadata has been removed from a dataset, unassociated with a dataset, has been corrupted, etc. Thus rather than simply invalidating or not trusting a dataset when lineage metadata has been removed from the dataset, unassociated with the dataset, has been corrupted, etc. as illustrated above, some embodiments may attempt to restore the lineage metadata. Examples will now be illustrated.

For example, in some embodiments, where lineage metadata has not been created for a dataset, or when the lineage metadata has been lost or corrupted, embodiments may include functionality to manually set up lineage metadata. Some embodiments illustrated herein may accomplish the functionality by a user, such as a trusted entity such as an administrator, manually defining the lineage metadata for a given dataset, an administrator having knowledge or other information about the ultimate source of a dataset and/or the history of operations on the dataset can manually create lineage metadata and associate the lineage metadata with the dataset. This may be done by embedding lineage metadata 112 into a dataset 106 as illustrated in FIG. 1A. Alternatively or additionally, the lineage metadata 112 may be stored and maintained in a database 120. The lineage metadata 112 and/or the dataset 106 can be signed using a certificate issued to the administrator such that consumers of the lineage metadata 112 and the dataset 106 can determine if they choose to trust the administrator as being authoritative.

In an alternative example, embodiments may be able to create lineage metadata by automatically evaluating operations to automatically construct lineage metadata. For example, in a database example, a computer module may be able to search a database and use database created metadata to create lineage metadata based on linkages between data items in a database. For example, embodiments may use cross references such as foreign keys, time and date stamps, and other information to determine an ultimate source of data and/or information about operations performed on data. Such information may include when data was created, when it was operated on, who created the data, who operated on the data, application or database context existing when data was created or operated on, etc. Typically, lineage can be automatically created by using database logs, together with timestamps, foreign keys for related data and login identities. In special cases the data in the database itself may be used, such as when the database actually contains a table to keep track of a change log.

In yet another alternative example, embodiments may create lineage metadata by performing database searching and evaluation to try to construct lineage metadata by deducing the ultimate source of data, lineage history of the data, etc. For example, a dataset may include a string of text, such as text from a newspaper or magazine article. A periodical publication database can be searched to determine where the data originated. This can be done by searching for all periodical publications that include the string of text and then using information about the time and/or date of the earliest publication of the text and the source associated with the earliest publication of the text to create lineage metadata about the ultimate source of the string of text. Information about other instances of the string of text at other times and/or in other periodicals can be added to the lineage metadata as subsequent operations on the lineage metadata indicating that a "quote" operation has been performed on the string of text.

Further, embodiments may be implemented in a system that is configured to improve itself by analyzing various data elements in the various repositories of the system and try to find relationships between them. When relationships are detected, embodiments may apply standardized transforms over an entire entity. For example, if one or many transforms hold for all elements in one column in one dataset the result may be applied to the whole column in a second dataset. These relationships may be automatically established and exposed to users. This can be done across multiple repositories.

Lineage metadata may be applied at various granularities and/or in a hierarchical fashion. For example, in a database context, a set of lineage metadata may be applicable to a database as a whole. Alternatively or additionally, sets of lineage metadata may be applicable to database tables. Sets of lineage metadata may be applicable to rows or columns in tables. Sets of lineage metadata may be applicable to cells in rows or columns Embodiments may be implemented where lineage metadata only exists at one level (such as the cell level). Alternatively lineage metadata may exist at multiple levels simultaneously. For example, a single cell may have lineage metadata associated with it at each of the cell level, the row or column level, the table level, and the database level.

Embodiments may be implemented to facilitate the use and distribution of certified datasets. In particular, consumers of data may require certain guarantees regarding the source, lineage, and/or integrity of data. Presentation of lineage metadata may be used to satisfy these guarantee requirements. Given that linage metadata can be signed by an authority, consumers can determine whether or not they choose to trust the authority, and thus, the data.

Some embodiments may use certified data with a filter. For example, the data may be filtered based on information in the lineage metadata, such as trust level for a signing entity, who operated on data, when the operations took place, context of operations, etc.

Given that lineage metadata can be derived from multiple different operations on a dataset, there may be several different entities that sign the lineage metadata and/or datasets, or several different instances of lineage metadata and/or datasets being singed. Thus, embodiments may implement a system of key unwinding where verification of the integrity of the lineage metadata occurs by applying various keys, checksums, or hashes in a reverse order to how they were originally applied so as to "unwind" integrity checks of the lineage metadata. For example, public/private key systems may be used to sign lineage metadata. As several different keys may be used to sign the lineage metadata where each key is applied sequentially as operations associated with each key are performed, unwinding may occur in a reverse sequential order. For example, when signing lineage metadata, the private keys may be applied in the order $k_1$, $k_2, \ldots, k_n$. When unwinding and verifying, the public keys may be applied in the order $k_n, \ldots, k_2, k_1$.

Various different methods may be implemented to sign lineage metadata and datasets. For example, in some embodiments, entities that operate on the datasets may have functionality for creating and signing lineage metadata as illustrated in FIG. 1A. In other embodiments, an oracle tool or other tool could perform lineage metadata creation and signing, such as is illustrated in FIG. 1B, if entities do not have the native ability to perform lineage metadata creation and signing.

Some embodiments may implement the ability to "cleanup" or consolidate lineage metadata. For example, large amounts of lineage metadata may be created over the course of the lifetime of a dataset. Embodiments may allow a master authority examine signatures of lineage metadata, to clean up or consolidate lineage metadata, and to vouch for (e.g., by applying a master signature) the cleaned-up or consolidated lineage metadata.

Datasets associated with lineage metadata can be utilized or treated in various different ways when it is determined that lineage metadata has been unassociated with datasets, when lineage metadata becomes corrupted, or when other issues arise. In some embodiments, any data not being associated with lineage metadata can be discarded so that it is not generally accessible. In some embodiments, data not associated with lineage metadata can be submitted for bootstrap operations that can be used to manually or automatically create lineage metadata for a dataset and associate the lineage metadata with the dataset as described above.

In some embodiments, datasets that are not associated with lineage metadata or are associated with corrupt, incomplete or missing lineage metadata may be marked to indicate their less trusted or untrusted status. The data can nonetheless be displayed to a user, but it may be displayed with a warning indicating the less trusted or un-trusted state of the lineage metadata. For example, a warning overlay, pop-up window, highlighting of the data in red (or other colors), or other indications may be used to indicate the less or untrusted nature of data.

Embodiments can show end-users lineage across multiple repositories by leveraging the ability to connect to multiple repositories and help users track how data has been moving across them. By being able to tap into multiple systems the quality of lineage metadata is increased compared to one single system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
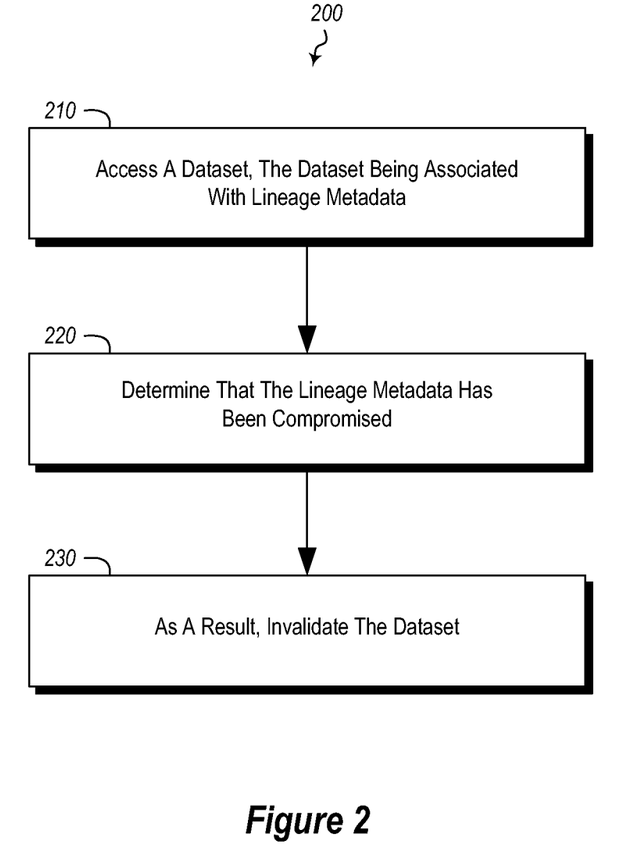
FIG. 2 illustrates a method of tracking lineage of data.

Referring now to FIG. 2, a method 200 is illustrated. The method 200 may be practiced in a network computing environment including a plurality of interconnected systems where data is shared between the systems. The method 200 includes acts for tracking lineage of data. The method includes accessing a dataset (act 210). The dataset is associated with lineage metadata. The lineage metadata may include, for example, data indicating the original source of the data, one or more intermediary entities that have performed operations on the dataset, the nature of operations performed on the dataset, etc.

The method 200 further includes determining that the lineage metadata has been compromised (act 220). For example, a determination may be made that the lineage metadata may have been removed from association with the dataset, may be corrupted, may be incomplete, etc.

As a result of determining that the lineage metadata has been compromised, the method 200 further includes invalidating the dataset (act 230).

The method 200 may be practiced where determining that the lineage metadata has been compromised comprises performing a checksum on the dataset and the lineage metadata. Alternatively or additionally, determining that the lineage metadata has been compromised may include determining that embedded lineage metadata has been removed from the dataset.

The method 200 may be practiced where invalidating the dataset includes making the dataset generally unavailable. This may be done, for example, by deleting the dataset or otherwise preventing entities from obtaining the dataset. Alternatively or additionally, invalidating the dataset may include marking the dataset as invalid, but nonetheless allowing entities to obtain the dataset. For example, entities could access the dataset but would know that it has validity issues. In some embodiments, an invalid dataset may be allowed to displayed to users, but it may be annotated with a warning indicating the less or un-trusted nature of the dataset.

Figure 3:
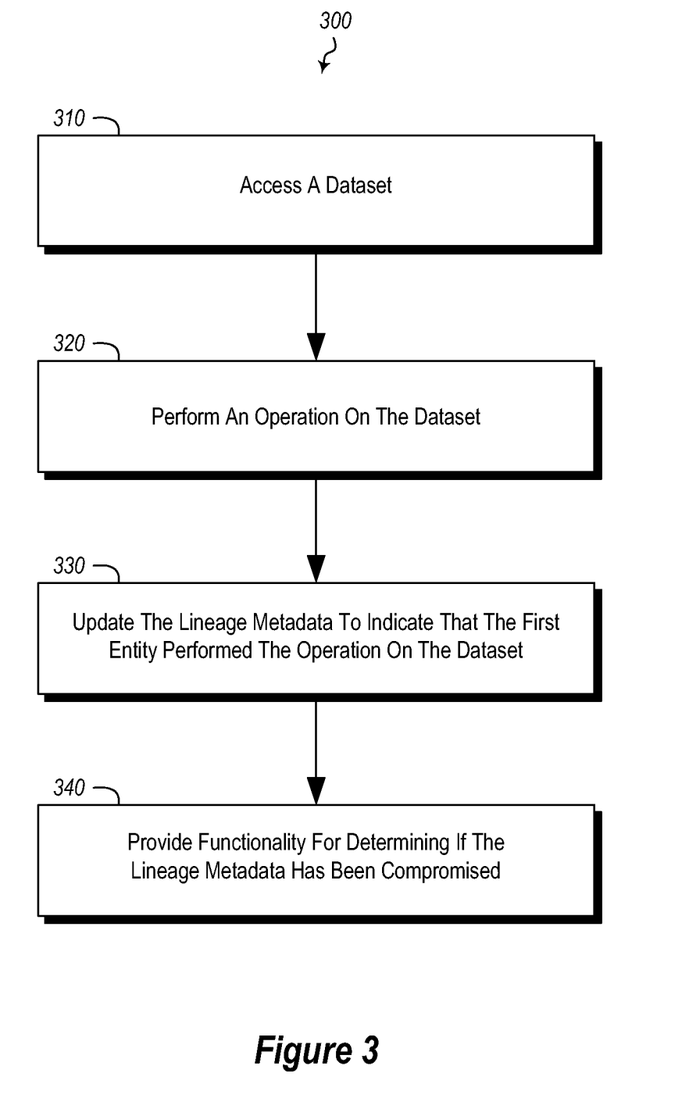
FIG. 3 illustrates another method of tracking lineage of data.

Referring now to FIG. 3, another method 300 is illustrated. The method 300 may be practiced in a network computing environment including a plurality of interconnected systems where data is shared between the systems. The method includes acts for tracking lineage of data. The method 300 includes accessing a dataset (act 310). The dataset is associated with lineage metadata. The lineage metadata may include, for example, data indicating the original source of the data, one or more intermediary entities that have performed operations on the dataset, the nature of operations performed on the dataset, etc.

The method 300 further includes, at a first entity, performing an operation on the dataset (act 320). For example, the dataset may be read from a storage medium, written to a storage medium, edited, transformed, had logical operations applied to it, etc.

The method 300 further includes, as a result of performing an operation on the dataset, updating the lineage metadata to indicate that the first entity performed the operation on the dataset (act 330). The method 300 further includes providing functionality for determining if the lineage metadata has been compromised (act 340). For example, embodiments may provide functionality for determining that the lineage metadata has been removed from association with the dataset, is corrupted, is incomplete, etc.

The method 300 may be practiced where providing functionality for determining if the lineage metadata has been compromised includes performing a checksum on the dataset and the lineage metadata. Alternatively or additionally, providing functionality for determining if the lineage metadata has been compromised may include signing the dataset and the lineage metadata using an encryption key. In some embodiments, the dataset and lineage metadata may be signed with a chain of keys as the dataset is operated on by different entities and the lineage metadata is updated to reflect the operations.

The method 300 may be practiced where the lineage metadata is associated with the dataset by a user manually creating the lineage metadata based on information the user has about the dataset, and the user manually associating the lineage metadata with the dataset. This may be used as a bootstrapping operation to associate lineage metadata with data sets in a first instance, or to restore missing or corrupted lineage metadata. A user may also manually sign the dataset and lineage metadata to provide functionality for determining if the lineage metadata has been compromised.

The method 300 may be practiced where the lineage metadata is associated with the dataset by a system automatically parsing logged operations on data in the dataset. For example, foreign keys in a database or other logging operations may be examined to determine the linage of data. The determination could be used to create lineage metadata that can be associated with the dataset.

The method 300 may be practiced where the lineage metadata is associated with the dataset by a system searching database repositories to determine the ultimate source of the dataset. In a very specific example, a system may automatically search a periodical database to find the earliest newspaper entry in which a particular dataset appears. The system could also potentially search for commentary by other newspaper entries on the first newspaper entry. This information could then be used to create lineage metadata that could be associated with the dataset.

The method 300 may be practiced where the lineage metadata is associated with the dataset and updated by a central governance entity that has API's allowing other entities to add, read or otherwise manage lineage metadata.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network computing environment comprising a plurality of interconnected systems where data is shared between the systems, a method of tracking the source, lineage, and integrity of data, the method comprising:
   accessing a dataset, the dataset having been signed by a first authority to ensure that the dataset has not been compromised;
   accessing lineage metadata associated with the dataset, the lineage metadata comprising data indicating the original source of the data and information about one or more operations which have been performed on the dataset, the information for each of the one or more operations including when the each operation was performed, an identity of an entity which performed the each operation, and the nature of the each operation, wherein the lineage metadata is signed by a second authority using a cryptographic certificate which allows dataset users to determine whether the lineage metadata has been compromised and whether to trust the second authority;
   determining a validity for the dataset by analyzing at least the signature of the first authority;
   determining a validity for the lineage metadata by analyzing at least the signature of the second authority;
   determining a trust level for the second authority; and
   based upon the determined validity of the dataset, the validity of the lineage metadata, and the determined trust level of the authority, performing an action that is associated with the dataset and the determined validity of the dataset, validity of the lineage metadata, and the trust level for the second authority.

2. The method of claim 1, further comprising determining that the lineage metadata has been compromised including performing a checksum on the dataset and the lineage metadata.

3. The method of claim 1, further comprising determining that the lineage metadata has been compromised including determining that embedded lineage metadata has been removed from the dataset.

4. The method of claim 1, wherein invalidating the dataset comprises making the dataset generally unavailable.

5. The method of claim 1, wherein invalidating the dataset comprises marking the dataset as invalid, but nonetheless allowing entities to obtain the dataset.

6. In a network computing environment comprising a plurality of interconnected systems where data is shared between the systems, a method of tracking lineage of data, the method comprising:
   accessing a dataset, the dataset having been signed by a first authority to ensure that the dataset has not been compromised;
   at a first entity, performing an operation on the dataset;
   accessing lineage metadata associated with the dataset, the lineage metadata comprising data indicating the original source of the data and information about one or more operations which have been performed on the dataset, the information for each of the one or more operations including when the each operation was performed, an identity of an entity which performed the each operation, and the nature of the each operation, wherein the lineage metadata is signed by a second authority using a cryptographic certificate which allows dataset users to determine whether the lineage metadata has been compromised and whether to trust the second authority;
   as a result of performing an operation on the dataset at the first entity, updating the lineage metadata to indicate that the first entity performed the operation on the dataset such that the lineage metadata includes when the operation performed at the first entity was performed, information about the first entity, an indication that the operation performed at the first entity was performed at the first entity, and the nature of the operation performed at the first entity; and
   computing a value which another entity can use to determine validity of the dataset and the lineage metadata.

7. The method of claim 6, further comprising providing functionality for determining if the lineage metadata has been compromised including performing a checksum on the dataset and the lineage metadata.

8. The method of claim 6, further comprising providing functionality for determining if the lineage metadata has been compromised including signing the dataset and the lineage metadata using an encryption key.

9. The method of claim 8, wherein the encryption key is part of a chain of keys used by various entities to add lineage metadata as the result of previous operations.

10. The method of claim 6, wherein the lineage metadata is associated with the dataset by a user manually creating the lineage metadata based on information the user has about the dataset, and the user manually associating the lineage metadata with the dataset.

11. The method of claim 6, wherein the lineage metadata is associated with the dataset by a system automatically parsing logged operations on data in the dataset.

12. The method of claim 6, wherein the lineage metadata is associated with the dataset by a system searching database repositories to determine the ultimate source of the dataset.

13. The method of claim 6, wherein the lineage metadata is associated with the dataset and updated by a central governance entity that has API's allowing other entities to manage lineage metadata.

14. The method of claim 6, wherein the lineage metadata is configured to be tracked on a database level, table level, row level, and cell level.

15. In a network computing environment comprising a plurality of interconnected systems where data is shared between the systems, a system for tracking lineage of data, the system comprising
   one or more processors having access to computer executable instructions that, when executed by the one or more processors, enable the processors to:
      access a dataset, the dataset having been signed by a first authority to ensure that the dataset has not been compromised;
      at a first entity, perform an operation on the dataset;
      access lineage metadata associated with the dataset, the lineage metadata comprising data indicating the original source of the data and information about one or more operations which have been performed on the dataset, the information for each of the one or more operations including when the each operation was performed, an identity of an entity which performed the each operation, and the nature of the each operation, wherein the lineage metadata is signed by a second authority using a cryptographic certificate which allows dataset users to determine whether the lineage metadata has been compromised and whether to trust the second authority;

as a result of performing a first operation on the dataset, update the lineage metadata to indicate that the first entity performed the operation on the dataset such that the lineage metadata includes when the operation performed at the first entity was performed, information about the first entity, an indication that the operation performed at the first entity was performed at the first entity, and the nature of the operation performed at the first entity;

computing a value which another entity can use to determine validity of the dataset and the lineage metadata;

manage the lineage metadata at a central governance entity to allow the lineage metadata to enter and leave various repositories while still providing consistent management of the lineage metadata.

16. The system of claim 15, further comprising providing functionality for determining if the lineage metadata has been compromised including performing a checksum on the dataset and the lineage metadata.

17. The system of claim 15, further comprising providing functionality for determining if the lineage metadata has been compromised including signing the dataset and the lineage metadata using an encryption key.

18. The system of claim 15, wherein the lineage metadata is associated with the dataset by a user manually creating the lineage metadata based on information the user has about the dataset, and the user manually associating the lineage metadata with the dataset.

19. The system of claim 15, wherein the lineage metadata is associated with the dataset by a system automatically parsing logged operations on data in the dataset.

20. The system of claim 15, wherein the lineage metadata is associated with the dataset by a system searching database repositories to determine the ultimate source of the dataset.

* * * * *